(12) United States Patent
Culross

(10) Patent No.: US 6,541,525 B2
(45) Date of Patent: Apr. 1, 2003

(54) SLURRY CATALYST REJUVENATION IN-SITU IN SLURRY REACTOR

(75) Inventor: Claude Clarence Culross, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/818,437

(22) Filed: Mar. 27, 2001

(65) Prior Publication Data

US 2002/0143074 A1 Oct. 3, 2002

(51) Int. Cl.[7] .......................... C07C 27/00; B01J 20/34
(52) U.S. Cl. .......................... 518/709; 518/715; 502/21
(58) Field of Search ............................ 518/700, 709, 518/715; 502/21

(56) References Cited

U.S. PATENT DOCUMENTS

| | | | |
|---|---|---|---|
| 5,260,239 A | 11/1993 | Hsia | 502/30 |
| 5,332,552 A | 7/1994 | Chang | 422/140 |
| 5,811,363 A | 9/1998 | Leviness et al. | 502/21 |
| 5,811,468 A | * 9/1998 | Chang et al. | 518/700 |
| 5,973,012 A | * 10/1999 | Behrmann et al. | 518/700 |

* cited by examiner

Primary Examiner—J. Parsa
(74) Attorney, Agent, or Firm—Norby L. Foss

(57) ABSTRACT

A process for rejuvenating reversibly deactivated catalyst particles in a three-phase slurry body of gas bubbles and catalyst particles in a slurry liquid, includes passing slurry from the top down to the bottom of the body through a slurry catalyst rejuvenating means. The slurry is sequentially passed through a first gas bubble reducing zone, a catalyst rejuvenating gas contacting zone, a second gas bubble reducing zone and then a downcomer transfer zone. The gas bubble reducing, contacting and at least a portion of transfer occur in slurry body. At least part of the means is in the slurry body.

15 Claims, 2 Drawing Sheets

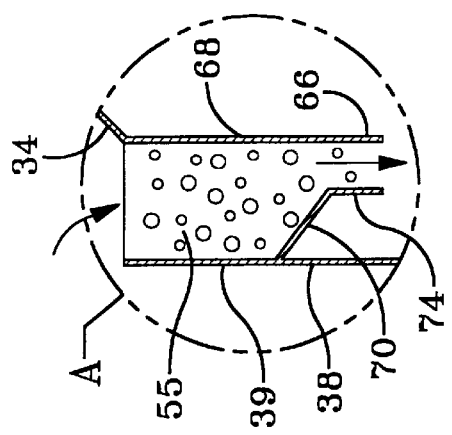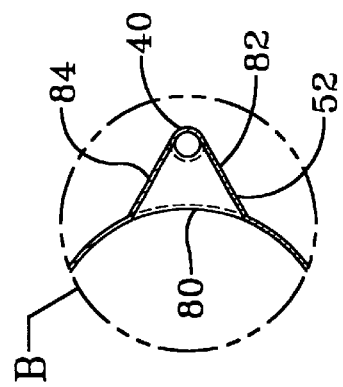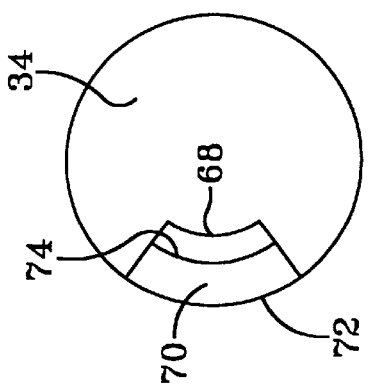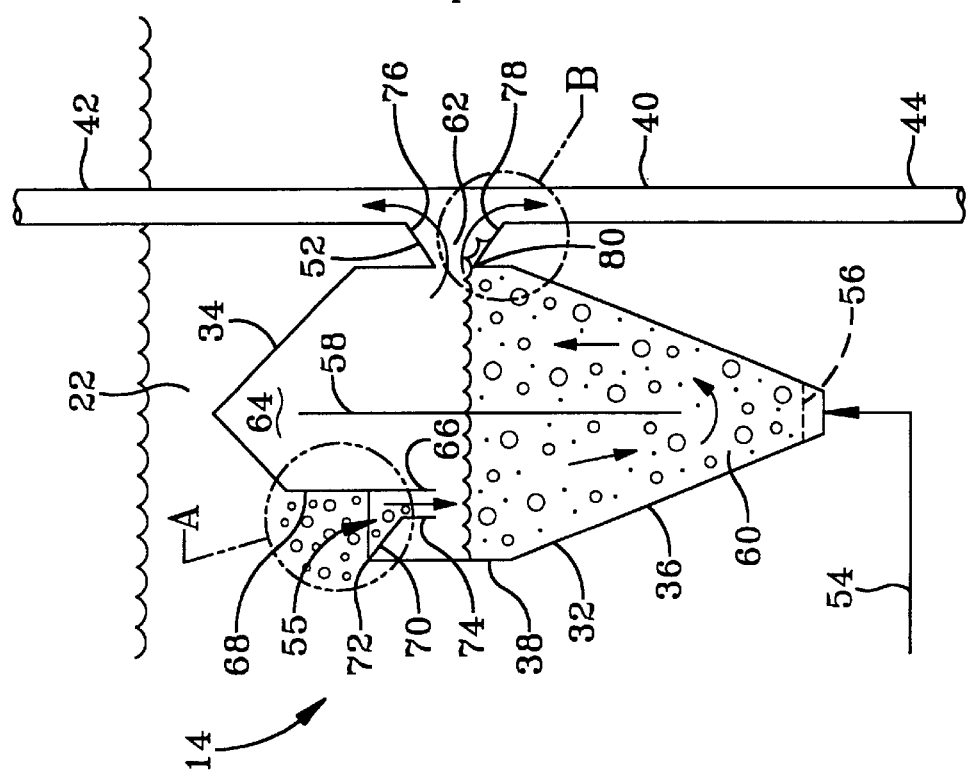

SLURRY CATALYST REJUVENATION IN-SITU IN SLURRY REACTOR

BACKGROUND OF THE DISCLOSURE

1. Field of the Invention

The invention relates to catalyst rejuvenation in a slurry. More particularly the invention comprises rejuvenating catalyst particles in a three-phase slurry body, by sequentially passing slurry from the top down to the bottom of the body through a first gas disengaging zone, a rejuvenating gas contacting zone, a second gas disengaging zone and then a downcomer, and a means for achieving this. This is useful for rejuvenating a Fischer-Tropsch hydrocarbon synthesis catalyst in-situ in a slurry hydrocarbon synthesis reactor.

2. Background of the Invention

Slurry hydrocarbon synthesis processes are well known and documented. In a slurry hydrocarbon synthesis process, synthesis gas comprising a mixture of $H_2$ and CO is bubbled up as feed gas through a three-phase, gas-liquid-solids slurry in a hydrocarbon synthesis reactor. The slurry liquid comprises hydrocarbon products of the synthesis reaction, the solids comprise a suitable Fischer-Tropsch type hydrocarbon synthesis catalyst and the gas bubbles comprise the feed gas and gaseous products of the synthesis reaction. Synthesis gas made from hydrocarbon feedstocks which contain nitrogen (i.e., natural gas) or nitrogen containing compounds (i.e., resids, coal, shale, coke, tar sands, etc.) invariably contains HCN and $NH_3$, either of which deactivates the catalyst. Some compounds formed in the slurry as by-products of the synthesis reaction, such as oxygenates, also cause reversible deactivation. deactivation by these species is reversible and catalytic activity is restored (the catalyst rejuvenated) by contacting the deactivated catalyst with a hydrogen rejuvenating gas. Thus, the activity of the hydrocarbon synthesis catalyst in the reactive slurry may be intermittently or continuously rejuvenated by contacting the slurry with hydrogen or a hydrogen containing gas, to form a catalyst rejuvenated slurry. This is disclosed, for example, in U.S. Pat. Nos. 5,260,239; 5,268,344; 5,817,702 and 5,811,468. In the '239 and '270 patents, rejuvenation takes place in an external vessel. In the '702 and '468 patents, slurry containing the rejuvenated catalyst is passed up towards the top of the reactor, where the feed gas concentration is low. It would be advantageous to be able to take the slurry to be rejuvenated from near the top of the reaction vessel, rejuvenate the catalyst inside, instead of in a vessel external of the reactor and then pass the rejuvenated slurry down near to the bottom of the vessel, to contact the incoming feed gas.

SUMMARY OF THE INVENTION

The invention relates to a process and means for slurry in-situ catalyst rejuvenation, in which slurry is passed from the top to the bottom of the slurry body in a reactor, through a rejuvenating zone and means located in the slurry body. The process rejuvenates the catalyst in the slurry in, and not external to the reactor, thereby eliminating the need for an external rejuvenation vessel. The invention may be practiced with any process employing a three-phase slurry in which the catalyst reversibly deactivates and is rejuvenated with a suitable rejuvenating gas. An example of a particularly suitable process is a slurry Fischer-Tropsch hydrocarbon synthesis process, in which the slurry comprises a particulate catalyst and gas bubbles dispersed in a hydrocarbon slurry liquid. In a slurry hydrocarbon synthesis process, the feed gas concentration is greatest at the bottom of the slurry (slurry body) in the reactor. Therefore, it is advantageous to remove the deactivated catalyst from near to the top of the slurry body where the concentration of the feed gas is lowest and pass the rejuvenated catalyst down to the bottom portion of the reactor. By slurry body is meant the body of three-phase slurry in reactor. By top and bottom of the slurry body, is respectively meant above and below the middle of the slurry body, and preferably as near to the top and bottom as possible.

Briefly, the process comprises rejuvenating reversibly deactivated catalyst particles in a three-phase slurry body, by sequentially passing slurry from the top down to the bottom of the body through a first gas disengaging zone, a rejuvenating gas contacting zone, a second gas disengaging zone and then a downcomer or transfer zone down, all of which occurs within the slurry body. Further, except for the first gas disengaging zone and the bottom exit of the downcomer transfer zone, the slurry being processed according to the invention is isolated from direct contact with the surrounding slurry body. Having the rejuvenation zone and the second gas disengaging and downcomer zones isolated from direct contact with the surrounding slurry body, enables the slurry to be rejuvenated by the process of the invention while the reactor is either off-line or on-line producing products. The rejuvenation process may be conducted continuously or intermittently in the reactor. At least a portion, but not necessarily all, of the gas bubbles in the slurry are removed in the gas disengaging zones. The first gas disengaging zone removes gas bubbles from the slurry as it passes through the zone, to produces a gas reduced slurry that passes into the rejuvenating zone, into which a rejuvenating gas is passed and contacts the catalyst particles in the gas reduced slurry. This rejuvenates the catalyst in the slurry and forms a rejuvenated slurry containing bubbles of rejuvenating gas, which is then passed through a second gas disengaging zone, to remove bubbles of rejuvenating gas and form a gas reduced and rejuvenated slurry, which is passed down to the bottom of the slurry body. By rejuvenated slurry is meant slurry in which the catalyst particles have been at least partially rejuvenated. By removing bubbles is meant that at least a portion of the gas bubbles is removed, as is explained below. Removing gas bubbles from the slurry increases its density, compared to the lower density of the higher gas content surrounding slurry body and slurry being rejuvenated in the rejuvenating zone. This density difference enables the rejuvenation process to be conducted entirely by gravity driven hydraulics. Thus, there is no need for slurry pumps.

Means useful for rejuvenating a reversibly deactivated catalyst according to the process of the invention conducting the process of the invention may comprise a simple closed vessel at least partially immersed in the slurry body, having a slurry entrance and exit, and means for injecting rejuvenating gas up into its interior. The entrance and exits are in direct fluid communication with the first and second gas disengaging means, each of which may comprise an upward opening cup or conduit that permits gas bubbles to rise up and out of the slurry passing through and which respectively feeds the gas-reduced slurry into the interior of the vessel and into a downcomer. The downcomer may be a simple, vertical pipe or conduit open at its top and bottom, part of which is immersed in the slurry body and feeds the rejuvenated and gas-reduced slurry down into the bottom of the surrounding slurry and with its top extending up and out the top of the slurry body, to permit the disengaged rejuvenating gas bubbles leave the slurry, before or as it passes down the conduit.

The invention briefly comprises a process for rejuvenating reversibly deactivated catalyst particles in a three-phase slurry, wherein slurry from a slurry body is sequentially passed from the top down to the bottom of the body through a first gas bubble reducing zone, a rejuvenating gas contacting zone in which a catalyst rejuvenating gas contacts the catalyst which is at least partially rejuvenated, a second gas bubble reducing zone and then a downcomer or transfer zone, wherein the gas bubble reducing and contacting occur within the slurry body, wherein at least a portion of the transfer zone is in the body and wherein the slurry comprises gas bubbles and solid catalyst particles in a slurry liquid. The bubble reducing zones, the rejuvenating gas contacting zone and at least a portion of the downcomer transfer zone are part of a single catalyst rejuvenating means at least partially immersed in the slurry body. In the embodiment in which the single rejuvenating means is immersed in a slurry in a slurry reactor, then the all of the downcomer transfer zone will also be immersed in the slurry body in the reactor. In greater detail the invention comprises a process for rejuvenating a reversibly deactivated catalyst in a three phase slurry body in a vessel, wherein the slurry comprises a slurry liquid in which is dispersed gas bubbles and particles of the catalyst, the process comprising (i) passing slurry from the upper portion of the slurry body through a first gas bubble reducing zone, to disengage and remove at least a portion of the bubbles and form a gas bubble reduced slurry, (ii) passing the gas bubble reduced slurry into a rejuvenating zone, (iii) passing a rejuvenating gas into the rejuvenating zone, in which it contacts the catalyst particles in the slurry and reacts with them to rejuvenate at least a portion and form a rejuvenated slurry containing gas bubbles, (iv) passing the rejuvenated slurry through a second gas bubble reducing zone to remove gas bubbles and form a gas bubble reduced and rejuvenated slurry and (iv) passing the gas bubble reduced and rejuvenated slurry into a downcomer slurry transfer zone, in which the gas bubble reduced and rejuvenated slurry passes down and into the lower portion of the slurry body, and wherein the gas bubble reducing zones, the rejuvenating zone and at least a portion of the downcomer slurry transfer zone are located in the slurry body. In the specific case of a slurry Fischer-Tropsch hydrocarbon synthesis process, the rejuvenation gas will be hydrogen or a hydrogen-containing gas.

In an embodiment with specific regard to a slurry hydrocarbon synthesis process, the invention comprises the steps of:

(a) contacting a synthesis gas comprising a mixture of $H_2$ and CO with a particulate hydrocarbon synthesis catalyst in the presence of catalyst deactivating species, in a slurry body comprising the catalyst and gas bubbles in a hydrocarbon slurry liquid, in which the $H_2$ and CO react under reaction conditions effective to form hydrocarbons from said synthesis gas, at least a portion of which are liquid at the reaction conditions and form the slurry liquid, and wherein the deactivating species reversibly deactivate the catalyst;

(b) passing slurry from the upper portion of the slurry body through a first gas bubble reducing zone, to remove at least a portion of the gas bubbles from the slurry and form a gas bubble reduced slurry;

(c) passing the gas bubble reduced slurry into a catalyst rejuvenation zone;

(d) passing a catalyst rejuvenating gas comprising hydrogen into the rejuvenation zone in which it contacts and reacts with the catalyst particles in the slurry, to rejuvenate and at least partially restore the activity of the catalyst to form (i) a rejuvenating offgas and (ii) a rejuvenated catalyst slurry containing bubbles comprising offgas and unreacted rejuvenating gas;

(e) passing the rejuvenated catalyst slurry into a second gas bubble removing zone to remove at least a portion of the gas bubbles from the rejuvenated slurry to form a gas reduced and rejuvenated catalyst slurry, and (f) passing the gas reduced and rejuvenated slurry into a downcomer slurry transfer zone in which it is passed down and into the bottom portion of said slurry body and wherein the gas bubble reducing zones, the rejuvenating zone and at least a portion of the downcomer slurry transfer zone are located in the slurry body.

The slurry reactor may be operating during rejuvenation or it may be taken off-line and batch rejuvenated. The rejuvenation steps (b) through (f) may be conducted either continuously or on a cyclical basis. When rejuvenation occurs while the hydrocarbon synthesis reactor is on-line and producing hydrocarbon liquids, a portion of these liquids is either continuously or intermittently withdrawn from the reactor as synthesized hydrocarbon product. In the context of the invention, the term "catalyst deactivating species" is meant to include species which reversibly deactivate the catalyst and wherein the catalyst activity is restored (the catalyst rejuvenated) by contact with a rejuvenating gas in-situ in the slurry liquid. Hydrogen or a hydrogen containing gas is useful for such rejuvenation in a hydrocarbon synthesis process, as has been demonstrated in the prior art. Finally, while HCN, $NH_3$ and certain types of oxygenates will deactivate a hydrocarbon synthesis catalyst, the invention is not intended to be limited to use only with a hydrocarbon synthesis process or a hydrogen rejuvenating gas, but is useful with any slurry reaction, catalyst and species which reversibly deactivate the catalyst and wherein the catalyst activity can be restored with an appropriate rejuvenating gas.

BRIEF DESCRIPTION OF DRAWINGS

FIG. 2 is an enlarged schematic cross-section of the rejuvenation means of the invention shown in FIG. 1.

FIG. 3 is a plan top view of the rejuvenation vessel shown in FIGS. 1 and 2.

FIG. 4 illustrates a cross-sectional side view of another embodiment of part of the means shown in FIG. 2.

FIG. 5 is a brief plan top view of a detail of the means in FIGS. 1 and 2.

DETAILED DESCRIPTION

Figure 1:
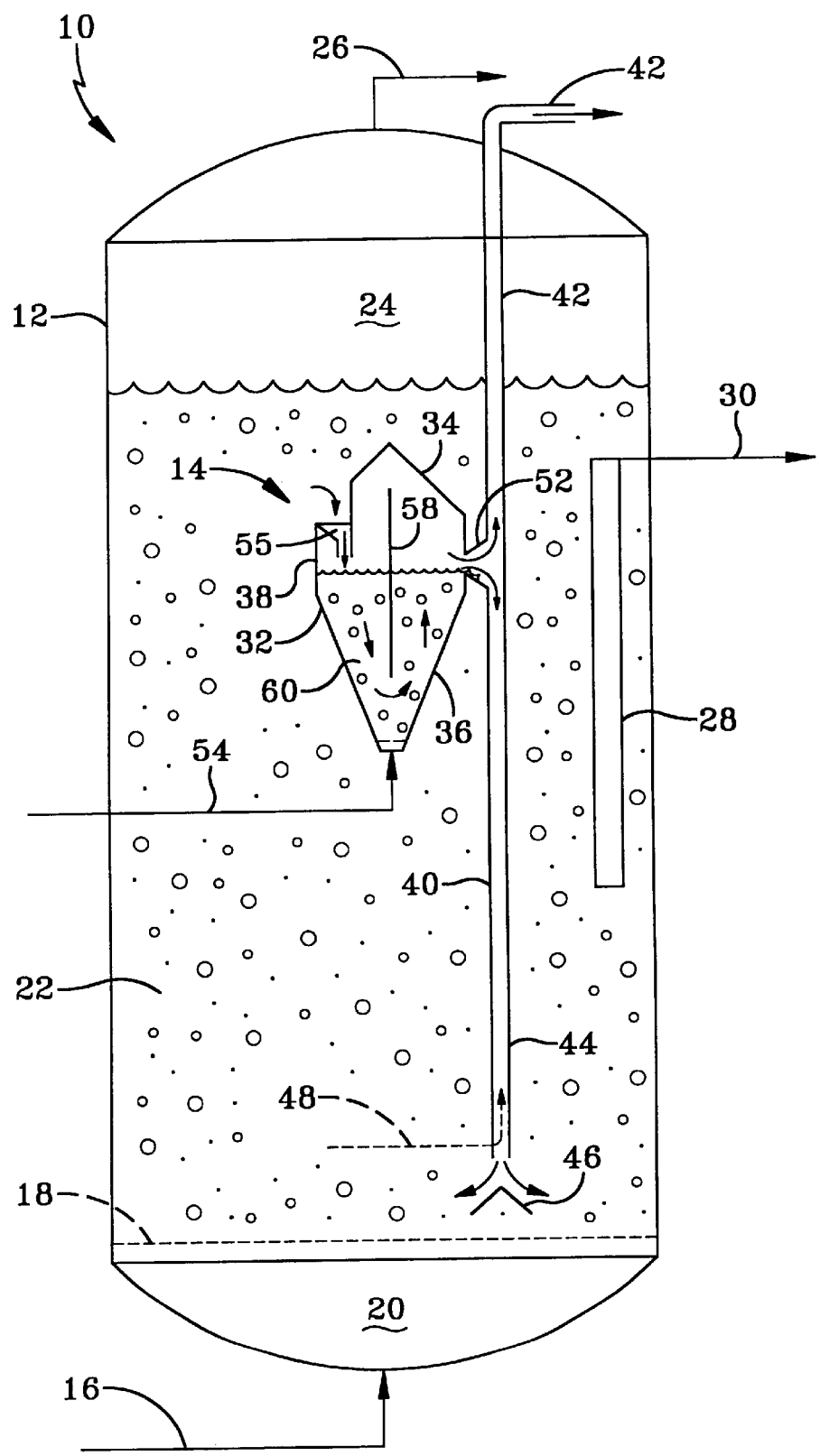
FIG. 1 is a schematic cross-section of a rejuvenation means of the invention in a slurry hydrocarbon synthesis reactor.

The invention will be illustrated in more detail, with specific regard to an embodiment in which it is employed to rejuvenate the catalyst particles in a slurry Fischer-Tropsch hydrocarbon synthesis reactor, that is producing hydrocarbons from a synthesis gas feed. As is known, in a slurry Fischer-Tropsch hydrocarbon synthesis process, a synthesis gas feed comprising a mixture of $H_2$ and CO is bubbled up into a slurry in which the $H_2$ and CO react in the presence of a suitable catalyst, under reaction conditions effective to form hydrocarbons, and preferably liquid hydrocarbons. Slurry hydrocarbon synthesis process conditions vary somewhat depending on the catalyst and desired products. Typical conditions effective to form hydrocarbons comprising mostly $C_{5+}$ paraffins, (e.g., $C_{5+}$–$C_{200}$) and preferably $C_{10+}$ paraffins, in a slurry hydrocarbon synthesis process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (60° F., 1 atm) per hour per volume of catalyst, respectively. A catalyst comprising a catalytic cobalt component is known to produce mostly hydrocarbons that are liquid and solid at room temperature, but liquid at the reaction conditions. While the mole ratio of the hydrogen to the carbon monoxide in the gas may broadly range from about 0.5 to 4, the stoichiometric consumption mole ratio for a slurry Fischer-Tropsch hydrocarbon synthesis reaction is typically about 2.1 in a slurry hydrocarbon synthesis process conducted under non-shifting conditions. A synthesis gas having other than a stoichiometric $H_2$ to CO mole ratio may also be used, as is known, a discussion of which is beyond the scope of the present invention. Synthesis gas may be formed by various means from coke, coal, bitumen, hydrocarbons and other hydrocarbonaceous materials. U.S. Pat. No. 5,993,138 gives a good review of various processes used to produce synthesis gas and their relative merits. A feed comprising methane, as in natural gas, is preferred for convenience, cleanliness and because it doesn't leave large quantities of ash to be handled and disposed of. Irrespective of the hydrocarbonaceous source used to produce the synthesis gas, they all typically contain nitrogen or nitrogen containing compounds that result in the presence NH3 and HCN in the synthesis gas. These will deactivate a Fischer-Tropsch hydrocarbon synthesis catalyst, particularly one comprising Co as the catalytic metal. Oxygenates are formed during hydrocarbon synthesis and can also deactivate the catalyst. Further, water can oxidize the surface of the catalytic metal component. It has been found that deactivation by these species is reversible and the catalyst can be rejuvenated by contacting it with hydrogen. This restoration of the catalytic activity of a reversibly deactivated catalyst is referred to as catalyst rejuvenation. However, while preferred and possible, complete restoration of the catalytic activity for all of the catalyst particles in the slurry passing through the rejuvenation means may not always be achieved. It's for this reason the expression "at least partially rejuvenates the catalyst" and the like, are used herein. The rejuvenation process also produces a rejuvenation product gas, which is referred to herein as a rejuvenation offgas, and this offgas contains some of the same catalyst deactivating species present in the synthesis gas that resulted in the catalyst deactivation in the first place (e.g., $NH_3$ and HCN). Therefore it is also desirable to remove this offgas from the rejuvenated slurry, before it passes back into the slurry body in the hydrocarbon synthesis reactor, to avoid recontaminating the slurry with the catalyst deactivating species removed by the rejuvenation. The rejuvenation will typically occur at the synthesis conditions when the process of the invention takes place in the synthesis reactor or reactor vessel, as opposed to a vessel exterior of the reactor. While it may be conducted in an exterior vessel, it is preferred that it be conducted in the synthesis reactor itself.

During rejuvenation, the presence of CO in the rejuvenation zone hinders catalyst rejuvenation until the CO is consumed. Thus, removing at least a portion of the gas bubbles which contain unreacted synthesis gas from the slurry before it is passed into the rejuvenation zone, substantially reduces the amount of CO present during rejuvenation. This reduces the amount of rejuvenation hydrogen needed and also results in a greater degree of rejuvenation. Further, the hydrogen or hydrogen containing rejuvenation gas passed into the rejuvenation zone raises the $H_2$ to CO mole ratio to greater than the stoichiometric. This results in conversion of the CO in the rejuvenation zone primarily to methane, and also tends to promote hydrogenolysis and cracking of the hydrocarbon liquid to lighter products (such as methane). For these reasons, it is beneficial to remove as much of the gas bubbles as is possible from the slurry before it is rejuvenated. The invention will be further understood with respect to the embodiments illustrated in the Figures.

FIG. 1 shows a slurry hydrocarbon synthesis reactor 10, briefly illustrated in schematic cross-section, as comprising a cylindrical vessel 12 containing a rejuvenation means of the invention 14 within. A feed gas line 16 feeds the synthesis gas feed up into the bottom of the reactor via a gas distribution grid or tray briefly illustrated as dashed line 18. Grid 18 is located over plenum space 20 and at the bottom of the three-phase slurry body 22 in the reactor. Except for gas distributors arrayed across its surface and extending through it, grid 18 is impervious to gas and liquids. Unreacted synthesis gas and gas products of the hydrocarbon synthesis reaction rise up out of the slurry, collect in gas space 24 at the top of the vessel and are removed by a gas product line 26. The slurry comprises a hydrocarbon liquid in which catalyst particles and gas bubbles are dispersed. The circles and dots respectively represent the gas bubbles and solid catalyst particles. The slurry hydrocarbon liquid comprises hydrocarbon products of the synthesis reaction that are liquid at the reaction conditions. The gas bubbles comprise the uprising synthesis gas, along with gas products of the synthesis reaction, a significant amount of which comprises steam or water vapor. A hydrocarbon liquid product withdrawal means 28, such as a filter, is located within the slurry body 22 for withdrawing the liquid hydrocarbon products from the reactor, via line 30. Catalyst rejuvenation means 14, shown enlarged in FIG. 2, comprises a cylindrical vessel 32, having conical upper 34 and lower 36 portions, joined by a vertical cylindrical center wall portion 38. If desired or necessary due to space limitations in the reactor, part of the upper conical portion 34 of vessel 32 may extend up out of the slurry. A downcomer 40, having respective upper and lower portions 42 and 44, comprises a hollow, vertical conduit, such as a pipe, in fluid communication with the interior of the rejuvenation vessel 32, via connecting fluid conduit 52. The lower portion 44 of the downcomer comprises the slurry transfer means, for passing rejuvenated slurry that has been reduced in gas bubbles down to the bottom portion of the slurry body. Portion 44 is wholly immersed in the slurry body, as shown. However, if the rejuvenation means 14 is in a vessel external of vessel 12, then at least a portion of the rejuvenated slurry transfer means will be located in the slurry body. A simple conical-shaped baffle 46, located just below the rejuvenated slurry exit at the bottom of the downcomer, prevents the uprising synthesis gas bubbles from entering up into the downcomer. If desired or necessary, an optional rejuvenation gas line 48 may be used to inject small amounts of a hydrogen-containing rejuvenation gas up into the downcomer, to maintain catalytic activity of the rejuvenated catalyst in the downflowing rejuvenated slurry. Also associated with the rejuvenating means 14 is a gas line 54, for passing a rejuvenating gas into the bottom of the interior of the vessel 32, and up through a gas distribution means 56, indicated by the dashed line. First and second gas bubble disengaging zones are respectively shown as 55 and 62. Zone 62 comprises the interior of the conduit 52 connecting the vessel 32 to the downcomer 40. A simple baffle plate 58, shown extending transversely across the interior of rejuvenation vessel 32, divides most of the interior of the vessel into two different fluid flow zones. This prevents the incoming, gas-bubble reduced slurry entering 32 from the slurry body, from flowing transversely across the interior of vessel 32 and then out and down through the downcomer, without having had sufficient contact with the hydrogen to rejuvenate the catalyst particles in the slurry. Thus, the three-phase slurry from the slurry body 22 in reactor 10 disengages gas bubbles in zone 55, to form a slurry reduced in gas bubbles. This increases the density of the gas-reduced slurry, which then flows down, via slurry conduit 66, into the interior of the rejuvenating vessel 32 and forms a rejuvenating slurry body 60. The slurry flow through the vessel 32, due to the presence of the flow-dividing baffle 58, is shown by the arrows. The uprising rejuvenating gas, in this case bubbles of hydrogen or a suitable hydrogen-containing gas indicated by the circles, contacts the deactivated catalyst particles in the slurry as it flows down, across and up through the interior of the vessel, and then out through conduit 52 into downcomer 40. As the slurry flows through the conduit 52, gas bubbles comprising the rejuvenating gas and gaseous rejuvenation products rise up and out of the rejuvenated slurry. This increases the density of the slurry to greater than that of the surrounding slurry body, enabling the now gas-reduced and rejuvenated slurry to flow into downcomer 40, and down through lower portion 44, due to the density difference. As the hydrogen in the rejuvenating gas contacts the catalyst particles in the slurry flowing through the rejuvenating vessel it reacts with them, thereby rejuvenating them and restoring at least a portion of their catalytic activity. This forms a rejuvenating offgas comprising unreacted hydrogen and gaseous products of the rejuvenation reaction. As shown in FIGS. 1 and 2, this offgas rises up into the upper portion 42 of the downcomer conduit, which carries it out of the synthesis reactor as shown in FIG. 1.

Returning to vessel 32, FIGS. 1, 2 and 3 show the first gas disengaging zone 55 as comprising an arcuate cavity in the shape of a sector of an annulus, in fluid communication with the surrounding slurry. This is formed by an inner wall 68 extending vertically down from the conical top 34 of vessel 32 to form part of conduit 66. Wall 68 is curved, with its perimeter parallel to that of the vertical outer wall 38 of the vessel. A downwardly sloping bottom wall 70 extends radially inward from the upper edge 72 of vertical wall 38, and terminates at its bottom in a curved vertical wall 74 which, together with wall 68, forms slurry conduit 66. As shown in FIGS. 1, 2 and 4, wall 74 extends vertically downward from the bottom edge of 70. The perimeter of both 70 and 74 are also parallel to that of 38. Wall 70 slopes down at an angle greater than the angle of friction (angle of repose) of the catalyst particles in the slurry, to prevent build-up of slurry particles in the first gas disengaging zone 55. FIG. 4 is a partial cross-sectional schematic view illustrating another embodiment of the first gas disengaging zone, section A. In this embodiment, instead of forming edge 72, a portion 39, of vertical wall 38 of vessel 32 extends vertically up as high as the intersection of 68 and 34. This wall extension provides a larger and deeper gas bubble disengaging zone. Thus, providing the extending vertical wall extension 39 provides a larger quiescent zone, in which the slurry within has more time to disengage gas bubbles, and with substantially less disturbance from the surrounding slurry 22. This is a preferred embodiment over that shown in FIGS. 1 and 2. FIG. 5 is a top plan view of a partial cross-section of slurry conduit 52, illustrating a detail of one embodiment of the shape of the conduit, which also functions in this embodiment as the second gas bubble disengaging zone 62. Referring to both FIGS. 2 and 5, in this embodiment the upper and lower walls 76 and 78 of the conduit 52, are respectively sloped upward and downward, as they extend radially outward from the vessel wall 38. The downward slope of 78 enables the intersection 80, of the upper portion of 78 with the vertical, outer wall of vessel 32, to act as a weir. It also increases the size of gas disengaging zone 62, as well as the gas and slurry entrance area into downcomer 40. The side walls 82 and 84 provide a fluid opening to downcomer 40 substantially larger than if they were parallel and laterally spaced apart the same distance as the inside diameter of 40. This all maximizes gas disengagement in 62 and minimizes slurry flow reduction into 40 by the outflowing rejuvenation offgas.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for rejuvenating reversibly deactivated catalyst particles in a three-phase slurry body comprises sequentially passing slurry from the top down to the bottom of said body through a first gas bubble reducing zone, a rejuvenating gas contacting zone in which a catalyst rejuvenating gas contacts said catalyst which is at least partially rejuvenated, a second gas bubble reducing zone and then a downcomer or transfer zone, wherein said gas bubble reducing and contacting occur within said body, wherein at least a portion of said transfer zone is in said body and wherein said slurry comprises gas bubbles and solid catalyst particles in a slurry liquid.

2. A process according to claim 1 wherein said reducing and contacting zones are part of a single catalyst rejuvenating means at least partially immersed in said slurry body.

3. A process for rejuvenating a reversibly deactivated catalyst in a three phase slurry body in a vessel, wherein said slurry comprises a slurry liquid in which is dispersed gas bubbles and particles of said catalyst, said process comprising (i) passing slurry from the upper portion of said slurry body through a first gas bubble reducing zone, to disengage and remove at least a portion of said bubbles and form a gas bubble reduced slurry, (ii) passing said gas bubble reduced slurry into a rejuvenating zone, (iii) passing a rejuvenating gas into said rejuvenating zone, in which it contacts said catalyst particles in said slurry and reacts with them to rejuvenate at least a portion and form a rejuvenated slurry containing gas bubbles, (iv) passing said rejuvenated slurry through a second gas bubble reducing zone to remove gas bubbles and form a gas bubble reduced and rejuvenated slurry and (iv) passing said gas bubble reduced and rejuvenated slurry into a downcomer slurry transfer zone, in which said gas bubble reduced and rejuvenated slurry passes down and into the lower portion of said slurry body, and wherein said gas bubble reducing zones, said rejuvenating zone and at least a portion of said downcomer slurry transfer zone are located in said slurry body.

4. A process according to claim 3 wherein said gas bubbles in said rejuvenated slurry formed in said rejuvenating zone comprises at least one of (i) unreacted rejuvenating gas and (ii) gaseous products of said rejuvenation.

5. A process according to claim 4 wherein said reducing and contacting zones are part of a single catalyst rejuvenating means at least partially immersed in said slurry body.

6. A process according to claim 5 wherein said vessel comprises a reactor.

7. A process according to claim 5 wherein said slurry comprises a hydrocarbon liquid containing gas bubbles and catalyst particles.

8. A process according to claim 7 wherein said reactor comprises a hydrocarbon synthesis reactor.

9. A process according to claim 8 wherein said hydrocarbon liquid comprises synthesized hydrocarbons that at liquid at the reaction conditions in said reactor.

10. A slurry hydrocarbon synthesis process comprises the steps of:

(a) contacting a synthesis gas comprising a mixture of $H_2$ and CO with a particulate hydrocarbon synthesis catalyst in the presence of catalyst deactivating species, in a slurry body comprising said catalyst and gas bubbles in a hydrocarbon slurry liquid, in which said H2 and CO react under reaction conditions effective to form hydrocarbons from said synthesis gas, at least a portion of which are liquid at the reaction conditions and form said slurry liquid, and wherein said deactivating species reversibly deactivate said catalyst;

(b) passing slurry from the upper portion of said slurry body through a first gas bubble reducing zone, to remove at least a portion of said gas bubbles from said slurry and form a gas bubble reduced slurry;

(c) passing said gas bubble reduced slurry into a catalyst rejuvenation zone;

(d) passing a catalyst rejuvenating gas comprising hydrogen into said rejuvenation zone in which it contacts and reacts with said catalyst particles in said slurry, to rejuvenate and at least partially restore the activity of said catalyst to form (i) a rejuvenating offgas and (ii) a rejuvenated catalyst slurry containing bubbles comprising said offgas and unreacted rejuvenating gas;

(e) passing said rejuvenated catalyst slurry into a second gas bubble removing zone to remove at least a portion of said gas bubbles from said rejuvenated slurry to form a gas reduced and rejuvenated catalyst slurry, and (f) passing said gas reduced and rejuvenated slurry into a downcomer slurry transfer zone in which it is passed down and into the bottom portion of said slurry body and wherein said gas bubble reducing zones, said rejuvenating zone and at least a portion of said downcomer slurry transfer zone are located in said slurry body.

11. A process according to claim 10 wherein said catalyst comprises a Fischer-Tropsch hydrocarbon synthesis catalyst.

12. A process according to claim 11 wherein said catalyst comprises a composite of at least one Group VIII catalytic metal component and a support component.

13. A process according to claim 12 wherein said reducing and contacting zones and at least a portion of said transfer zone are part of a single catalyst rejuvenating means at least partially immersed in said slurry body.

14. A process according to claim 13 wherein said slurry body is located in a slurry hydrocarbon synthesis reactor.

15. A process according to claim 14 wherein all of said transfer zone is located is said slurry body.

* * * * *